Figure 1:
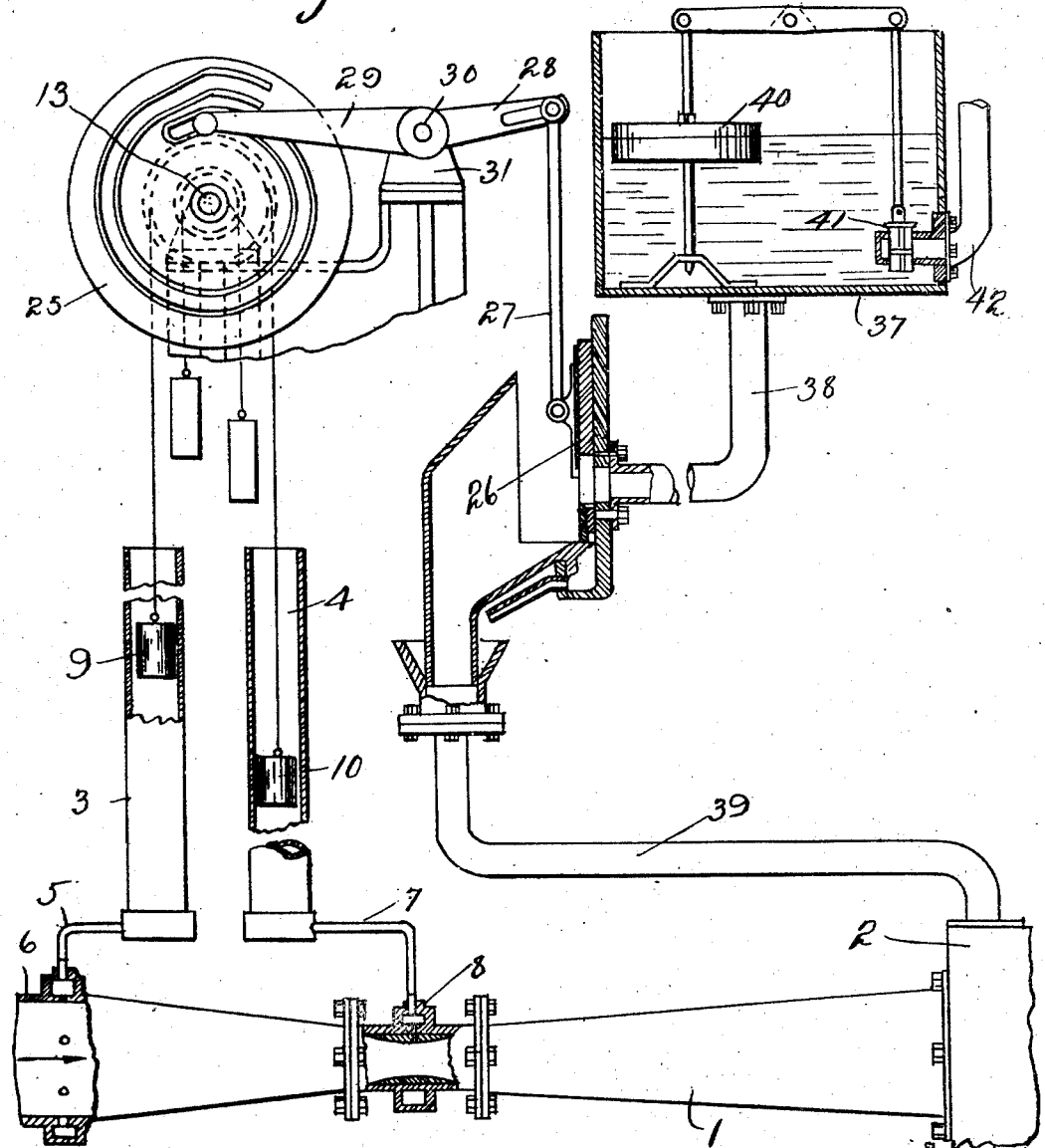

No. 868,776. PATENTED OCT. 22, 1907.
J. H. GREGORY, W. W. JACKSON & F. N. CONNET.
AUTOMATIC FLOW REGULATOR FOR LIQUIDS AND GASES.
APPLICATION FILED DEC. 17, 1906.

2 SHEETS—SHEET 1.

Witnesses
Frank A. Foster
E. J. Ogden

Inventors
John H Gregory
Walter W Jackson
Frederick N Connet

By Howard E Barlow
Attorney

No. 868,776. PATENTED OCT. 22, 1907.
J. H. GREGORY, W. W. JACKSON & F. N. CONNET.
AUTOMATIC FLOW REGULATOR FOR LIQUIDS AND GASES.
APPLICATION FILED DEC. 17, 1906.
2 SHEETS—SHEET 2.
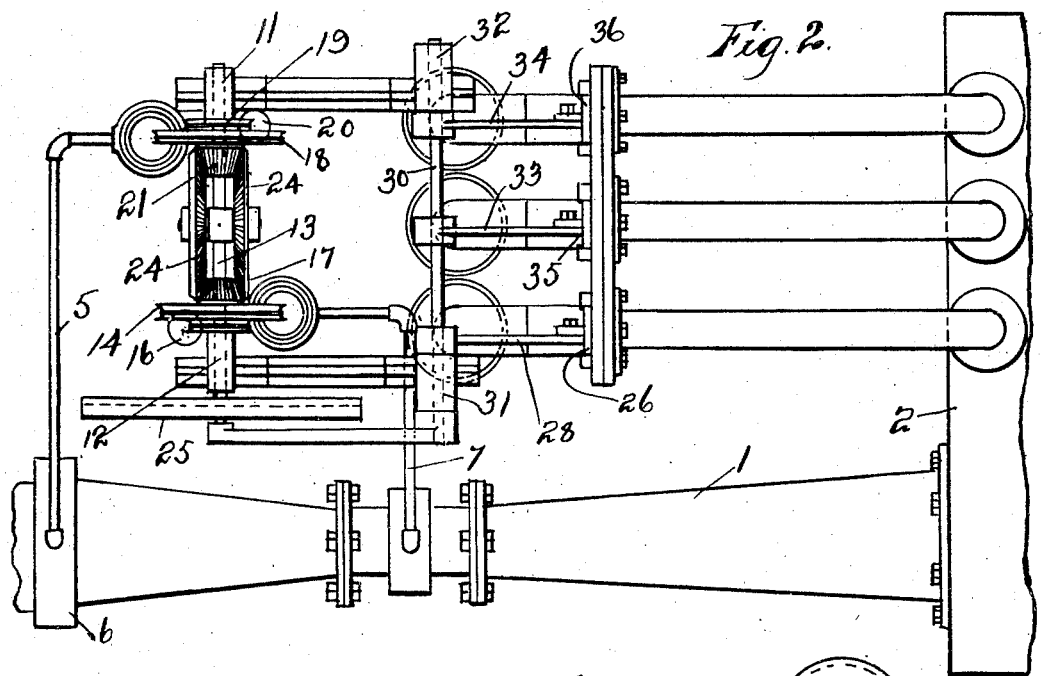
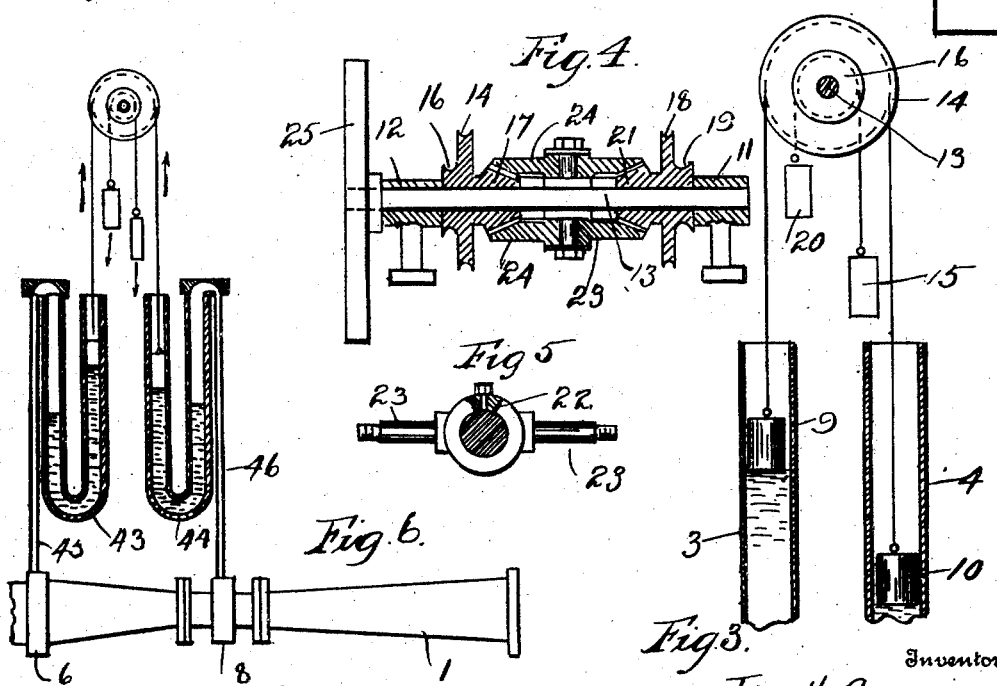
Witnesses
Frank A. Foster
E. I. Ogden
Inventors
John H. Gregory
Walter W. Jackson
Frederick N. Connet.
By Howard E. Barlow
Attorney

UNITED STATES PATENT OFFICE.

JOHN H. GREGORY AND WALTER W. JACKSON, OF COLUMBUS, OHIO, AND FREDERICK N. CONNET, OF PROVIDENCE, RHODE ISLAND, ASSIGNORS TO BUILDERS IRON FOUNDRY, OF PROVIDENCE, RHODE ISLAND, A CORPORATION.

AUTOMATIC FLOW-REGULATOR FOR LIQUIDS AND GASES.

No. 868,776.  Specification of Letters Patent.  Patented Oct. 22, 1907.

Application filed December 17, 1906. Serial No. 348,147.

*To all whom it may concern:*

Be it known that we, JOHN H. GREGORY, WALTER W. JACKSON, and FREDERICK N. CONNET, citizens of the United States, said GREGORY and JACKSON residing at Columbus, in the county of Franklin and State of Ohio, and said CONNET residing at Providence, county of Providence, and State of Rhode Island, have invented certain new and useful Improvements in Automatic Flow-Regulators for Liquids and Gases, of which the following is a specification, reference being had therein to the accompanying drawing.

This invention relates to means whereby the velocity of certain liquids or gases passing through a given aperture, automatically controls the flow of certain other liquids or gases.

The object of the invention is to provide a device that will indicate the flow of liquids or gases through a given aperture, said flow to operate floats which floats in turn operate one or more gates to control and allow a proportional flow of other chemicals or gases.

This device is more particularly designed to operate in connection with a city water supply where the water possesses certain impurities that are to be precipitated by means of chemicals deposited in the water for that purpose. These chemicals are supplied from any number of tanks discharging into the water in quantities proportioned to the amount of water use, and this supply is governed and controlled automatically by the velocity of the inflowing water. To accomplish this purpose we have adopted a pipe or tube similar in construction to that commonly known as the "Venturi tube", described in United States Patent No. 381,373, April 17, 1888, and have connected to said tube two chambers one communicating with the high pressure side of the tube and the second chamber communicating with the neck or reduced portion of said tube. In each of these chambers is supported a float the height of each indicating the pressure in the tube at their respective connecting points, and the vertical movement of said floats is arranged through suitable mechanism to control the opening and closing of the chemical supply gates.

This invention is not confined to controlling the flow of chemicals by the flow of liquids as the flow of liquids may be made to control the flow of gases, or the flow of gases may control the flow of liquids, or again the flow of gases may control the flow of gases, or a combination of gases and liquids, any of which may be subsequently mixed together in any predetermined proportions if desired; broadly speaking, our invention covers the automatic controlling of the flow of any gases or liquids by the flow of other gases or liquids.

The invention consists of other novel features and parts and combinations of the same as will be fully described hereinafter and then pointed out in the appended claims.

A practical embodiment of the invention is represented in the accompanying drawings, forming a part of this specification, in which similar characters of reference indicate corresponding parts in all the views.

In the drawings: Figure 1—is a side elevation of the device illustrating an operating arrangement of the mechanism with portions broken away to better illustrate the action of the same. Fig. 2—is a plan view of the device with the three chemical tanks removed, showing the chemical inlet gates and the pipe connection from said gates to the mixing tank. Fig. 3—is a detail showing the floats, also the sheaves to which the flexible connections are secured and the counterbalance weights. Fig. 4—is a view partially in section showing the horizontal shaft 13 and the operating mechanism mounted thereon. Fig. 5—is a detail of the yoke and pair of trunnions on which gears 24—24 are mounted. Fig. 6—is a detail showing the V-shaped tubes filled with liquid employed for operating the floats when gas is passing through the main inlet tube.

Although the device may be operated by the flow of any liquids or gases to control the flow of other liquids or gases, we will first describe the same as being operated by the flow of water through the main tube to automatically control the flow of a plurality of different chemicals all to be subsequently deposited into a common reservoir for the purpose of precipitating the impurities in the water.

Referring to the drawings at 1 is the main inlet tube through which the water flows to the mixing receptacle or reservoir 2.

At 3 and 4 are two upright chambers or tubes, 3 being connected by the small pipe 5 to the pressure or inlet side 6 of the main tube, and tube 4 is connected through the small pipe 7 to the contracted neck portion 8 of said tube. In these tubes are the floats 9 and 10 supported on the column of water in the same. The height of these floats is controlled by the velocity of water passing through the said tube and their difference indicates the quantity, the principle and operation of which is more particularly described in the patent above referred to. A horizontal shaft 13 is mounted above these upright tubes to turn freely in the bearings 11 and 12 and on this shaft is loosely mounted the sheave 14 to which is secured a wire or other flexible connection from the float 9. A counterbalance 15 also acts on this sheave through the small sheave 16 which is attached thereto, to rotate the large sheave when the float 9 rises. To the inner face of this sheave 14 is fixed the beveled pinion 17. Mounted at the opposite end of this shaft 13 are two sheaves and a pinion similar to those just mentioned. The sheaves 18 and 19 being connected to the float 10 and weight 20 respectively by flexible connections, and the pinion 21 being also connected to the sheaves 18 and 19 to turn with them on said shaft. Fixed to this shaft between the two pinions 17 and 21 is the yoke 22 and a pair of trunnions 23—23 (see Fig. 5). Mounted on these trunnions and meshing into the said pinions are the pair of gears 24—24, this arrangement thereby forming what is commonly known as the sun and planet system of gearing. At one end of this shaft 13 is fixed a large cam 25 (see Fig. 1) that is caused to rotate by the movement of the floats through the differential gearing above described, and by its movement open and close the gate 26 through its connection 27, arm 28 and lever 29. When it is desired to operate more than one gate from this cam the shaft 30 may be mounted in bearings 31 and 32 and to it may be secured any additional number of arms to operate as many gates, the same as arms 33 and 34 (see Fig. 2) operate the gates 35 and 36.

At 37 is a chemical tank located in any convenient place and arranged to deposit its contents into the mixing reservoir 2 through the pipes 38 and 39, the quantity of the flow being controlled by the movement of the gate 26. At 40 is a float in said chemical tank which actuates the inlet valve 41 to automatically maintain a given head in said tank by controlling the inflow through the inlet pipe 42. Any desired number of these chemical tanks may be used and operated by the mechanism shown and described.

When gas is forced through the main supply tube 1 its action in passing through the contracted portion is much the same as that of a liquid. Two U-shaped tubes 43 and 44, (see Fig. 6) partially filled with liquid are employed. One of these tubes communicates with the contracted portion 8 and the other with the pressure side of the main tube 6 through the small pipes 45 and 46, and the pressure of gas in the main tube operates the liquid in the U-shaped tubes to raise and lower the floats and by them open and close the gates through the actuating mechanism above described. In place of chemical tanks, gas receptacles may be used to supply gases instead of chemicals if desired, or a combination of gas and chemical receptacles to supply either one or both to be mixed together in any predetermined quantities for subsequently mixed with the gases or liquids in the reservoir 2.

The operation of the device may be further described as follows: The difference in the height of the floats indicate the quantity as well as the velocity of the substance passing through the main tube. When there is no flow through the tube the floats are equal in height and as soon as the flow begins both floats fall somewhat, float 10 falling to a lower level than float 9, and the greater the velocity through the tube the greater difference between the floats. As one float falls lower than the other the cam 25 is rotated an amount equal to that difference through the well known action of the differential gearing above described, and as said cam rotates it either raises or lowers the gate 26 through the connections shown and nicely controls the flow of the substance from the tank.

An essential feature of the device is that the flow through the main supply tube not only actuates mechanism to admit a quantity of other liquids or gases but that this flow so controls and regulates said liquids and gases that they will always be in a predetermined ratio to the amount passing through the main tube and will increase and decrease in direct proportion to the increase and decrease of the flow through said main tube.

Our invention is not restricted to the construction and arrangement of parts herein shown and described nor to the various details thereof, as the same may be modified in various particulars without departing from the spirit and scope of our invention, one practical embodiment of which has been herein illustrated and described without attempting to show all of the various forms and modifications in which our invention might be embodied.

Having thus described my invention, what I claim as new and desire to secure by Letters Patent, is:

1. In a device for supplying liquids or gases, a main supply pipe, an auxiliary supply vessel and means operated by the difference between the pressures at two points in the main pipe to control the flow from the said auxiliary supply so that the quantity drawn from the auxiliary supply will always be in a predetermined ratio to the quantity passing through said main pipe.

2. In a device for supplying liquids or gases, a main supply pipe having a neck or contracted portion, an auxiliary supply vessel, and means including two floats operated by a variation in the flow through said main pipe and its contracted portion to control the flow from said auxiliary pipe.

3. In a device for supplying liquids or gases, a main supply pipe, an auxiliary supply vessel and means including floats operated by a variation in the flow in the main pipe to operate gates and automatically regulate the flow from the said auxiliary supply so that the quantity drawn from the latter will always be in a given proportion to the quantity passing through said main pipe.

4. In a device for supplying liquids or gases, a main supply pipe having a neck or contracted portion, an auxiliary supply vessel, means including two floats operated by the different pressures in said main pipe and its contracted portion to automatically control the flow from said auxiliary supply so that the quantity drawn from the auxiliary supply will always be proportioned to the quantity passing through said main pipe.

5. In a device for supplying liquid and gases, a main supply pipe, an auxiliary supply vessel, said pipe having a body portion and a contracted neck the pressure of the flowing substance in said body portion being greater than that in the neck, and means operated by these two pressures to automatically control the flow of said auxiliary supply.

6. In a device for supplying liquids or gases, a main supply pipe, auxiliary supply pipes, said main pipe having a body portion and a contracted neck whereby when the liquid is flowing two different pressures are obtained, and floats actuated by these pressures to operate gates through their difference in height, and automatically regulate the flow through the auxiliary pipes.

7. In a device for supplying liquid or gases, a main supply pipe, auxiliary supply pipes, said main supply pipe having a body portion and a contracted neck whereby two different pressures are obtained when the liquid is flowing, and means whereby the difference in these pressures serve to control the flow from said auxiliary supply pipes so that the quantity drawn from the latter will be in a given ratio to some function of the difference in said pressures.

8. In a device for supplying liquid or gases, a main supply pipe, auxiliary supply pipes, said main supply pipe having a body portion and a contracted neck whereby two different pressures are obtained when the liquid is flowing, two tubes, one connected to the high and one to the low pressure portions of said tubes, floats in said tube, and means actuated by said floats to operate gates and automatically regulate the flow from said auxiliary pipes.

9. In a device for supplying liquid or gases, a main supply pipe, auxiliary supply pipes, said main supply pipe having a body portion and a contracted neck whereby two different pressures are obtained when the liquid is flowing, two tubes each open at one end and having their opposite ends connected to the main pipe, one to the high pressure, and one to the low pressure portion of the same, floats in said tubes, and means whereby the action of said floats operate a rotatable cam to open and close gates and automatically regulate the flow from said auxiliary supply.

In testimony whereof we affix our signature in presence of two witnesses.

JOHN H. GREGORY.
WALTER W. JACKSON.
FREDERICK N. CONNET.

Witnesses as to J. H. G. & W. W. J.:
  HAYES L. JONES,
  HARRY S. HOLTON.

Witnesses as to F. N. C.:
  WM. R. TILLINGHAST,
  CHAS. G. RICHARDSON.